(12) United States Patent
Molin et al.

(10) Patent No.: US 12,299,839 B2
(45) Date of Patent: May 13, 2025

(54) GENERATING AN IMAGE OF THE SURROUNDINGS OF AN ARTICULATED VEHICLE

(71) Applicant: RM ACQUISITION, LLC, Boise, ID (US)

(72) Inventors: Hans M. Molin, Mission Viejo, CA (US); Andreas U. Kuehnle, Strangnas (SE); Marton Gabor Gyori, Budapest (HU); Huba Nemeth, Budapest (HU); Cathy L. Boon, Orange, CA (US)

(73) Assignee: RM ACQUISITION, LLC, Chicago, IL (US)

( * ) Notice: Subject to any disclaimer, the term of this patent is extended or adjusted under 35 U.S.C. 154(b) by 326 days.

(21) Appl. No.: 17/488,677

(22) Filed: Sep. 29, 2021

(65) Prior Publication Data

US 2022/0019815 A1    Jan. 20, 2022

Related U.S. Application Data

(63) Continuation of application No. 15/893,206, filed on Feb. 9, 2018, now Pat. No. 11,170,227, which is a
(Continued)

(51) Int. Cl.
*G06K 9/00*       (2022.01)
*B60R 1/24*       (2022.01)
(Continued)

(52) U.S. Cl.
CPC ............. *G06T 3/4038* (2013.01); *B60R 1/24* (2022.01); *B60R 1/27* (2022.01); *G01B 11/002* (2013.01);
(Continued)

(58) Field of Classification Search
CPC . B60R 1/00; H04N 7/181; H04N 7/18; H04N 5/247; H04N 5/2624; H04N 5/265;
(Continued)

(56) References Cited

U.S. PATENT DOCUMENTS 4,620,717 A * 11/1986 Ivony ................ B62D 53/00
                                                    280/432
5,908,081 A *  6/1999 Olson ................ B62D 9/00
                                                    180/419
(Continued)

FOREIGN PATENT DOCUMENTS

DE   10 2004 050 149 A1   4/2006
EP      2 629 237 A1      8/2013

*Primary Examiner* — Shawn S An
(74) *Attorney, Agent, or Firm* — MARSHALL, GERSTEIN & BORUN LLP

(57) ABSTRACT

Systems and methods for generating an image of the surroundings of an articulated vehicle are provided. According to an aspect of the invention, a processor determines a relative position between a first vehicle of an articulated vehicle and a second vehicle of the articulated vehicle; receives a first image from a first camera arranged on the first vehicle and a second image from a second camera arranged on the second vehicle; and combines the first image and the second image based on the relative position between the first vehicle and the second vehicle to generate a combined image of surroundings of the articulated vehicle.

20 Claims, 10 Drawing Sheets

Related U.S. Application Data continuation of application No. 14/247,710, filed on Apr. 8, 2014, now abandoned.

(51) Int. Cl.

| | | |
|---|---|---|
| *B60R 1/27* | (2022.01) |
| *G01B 11/00* | (2006.01) |
| *G01B 11/02* | (2006.01) |
| *G01S 11/12* | (2006.01) |
| *G06T 3/4038* | (2024.01) |
| *G06T 7/20* | (2017.01) |
| *G06V 10/10* | (2022.01) |
| *G06V 20/56* | (2022.01) |
| *H04N 5/262* | (2006.01) |
| *H04N 5/265* | (2006.01) |
| *H04N 7/18* | (2006.01) |
| *H04N 23/90* | (2023.01) |

(52) U.S. Cl.
CPC ............ *G01B 11/022* (2013.01); *G01S 11/12* (2013.01); *G06T 7/20* (2013.01); *G06V 10/10* (2022.01); *G06V 20/56* (2022.01); *H04N 5/2624* (2013.01); *H04N 5/265* (2013.01); *H04N 7/181* (2013.01); *H04N 23/90* (2023.01); *G06T 2207/30252* (2013.01); *G06V 10/16* (2022.01)

(58) Field of Classification Search
CPC ..... G01B 11/022; G01B 11/002; G01S 11/12; G06K 9/00791; G06K 9/52; G06K 9/20; G06T 3/4038; G06T 7/20
See application file for complete search history.

(56) References Cited

U.S. PATENT DOCUMENTS

| | | | |
|---|---|---|---|
| 6,923,080 B1 | 8/2005 | Dobler et al. |
| 7,030,912 B1 | 4/2006 | Honma |
| 7,139,412 B2 | 11/2006 | Kato et al. |
| 7,226,134 B2 | 6/2007 | Horn et al. |
| 7,365,653 B2 | 4/2008 | Yang et al. |
| 7,840,026 B2 * | 11/2010 | Nishiuchi ................ G06T 7/73 |
| | | | 382/128 |
| 8,184,160 B2 | 5/2012 | Hongo et al. |
| 8,315,433 B2 | 11/2012 | Hsu et al. |
| 9,144,714 B2 * | 9/2015 | Hollinger ............ H04N 23/698 |
| 2002/0134151 A1 * | 9/2002 | Naruoka ................ G06T 7/50 |
| | | | 382/104 |
| 2006/0033657 A1 * | 2/2006 | Lawrence ............ H01Q 1/1257 |
| | | | 342/357.37 |
| 2006/0125919 A1 * | 6/2006 | Camilleri ................ G08G 1/16 |
| | | | 348/148 |
| 2006/0192660 A1 * | 8/2006 | Watanabe .............. H04N 7/181 |
| | | | 348/E7.086 |
| 2008/0044061 A1 * | 2/2008 | Hongo ...................... B60R 1/00 |
| | | | 382/104 |
| 2008/0122597 A1 * | 5/2008 | Englander ................ B60R 1/00 |
| | | | 348/E7.086 |
| 2008/0205706 A1 | 8/2008 | Hongo |
| 2008/0252729 A1 | 10/2008 | Chiu et al. |
| 2009/0022423 A1 | 1/2009 | Ehlgen et al. |
| 2009/0097708 A1 | 4/2009 | Mizuta |
| 2009/0174574 A1 * | 7/2009 | Endo ..................... G01S 17/86 |
| | | | 340/932.2 |
| 2010/0020170 A1 | 1/2010 | Higgins-Luthman et al. |
| 2010/0329510 A1 | 12/2010 | Schmid |
| 2012/0013642 A1 * | 1/2012 | Sumi ..................... H04N 5/265 |
| | | | 345/629 |
| 2012/0249791 A1 | 10/2012 | Shen et al. |
| 2013/0021453 A1 | 1/2013 | Gignac et al. |
| 2013/0079983 A1 * | 3/2013 | Ehlgen ................... G06V 10/10 |
| | | | 348/148 |
| 2013/0128022 A1 | 5/2013 | Bose et al. |
| 2013/0141542 A1 | 6/2013 | Tsuchiya et al. |
| 2014/0025284 A1 * | 1/2014 | Roberts .................. G08G 1/163 |
| | | | 701/300 |
| 2014/0078294 A1 | 3/2014 | Zemany |
| 2014/0169630 A1 * | 6/2014 | Fukata .................... B60R 1/002 |
| | | | 382/103 |
| 2014/0192212 A1 * | 7/2014 | He ........................ H04N 23/90 |
| | | | 399/296 |
| 2016/0307300 A1 * | 10/2016 | Chen ...................... H04N 5/265 |
| 2016/0352996 A1 * | 12/2016 | Qian ........................ G06T 5/90 |

* cited by examiner

GENERATING AN IMAGE OF THE SURROUNDINGS OF AN ARTICULATED VEHICLE

CROSS REFERENCE TO RELATED APPLICATIONS

This application is a continuation of U.S. application Ser. No. 15/893,206, filed Feb. 9, 2018, which is a continuation of U.S. application Ser. No. 14/247,710, filed Apr. 8, 2014, the entire disclosures of which are herein expressly incorporated by reference.

BACKGROUND OF THE INVENTION

The present invention relates to systems and methods for generating an image of the surroundings of an articulated vehicle, in which different parts of the vehicle are capable of moving with respect to each other. An example of an articulated vehicle is a tractor-trailer in which a tractor pulls a trailer. The tractor and the trailer may travel in different directions at times, such as when the tractor begins to turn a corner.

Related art systems use multiple cameras arranged on a single-body vehicle to generate a birds-eye view image of the surroundings of the vehicle. For example, U.S. Pat. No. 7,139,412 discloses a system in which a plurality of cameras are mounted on a vehicle such that there is some overlap between the fields of view of adjacent cameras. Separate images acquired by the plurality of cameras are combined to generate a birds-eye view image of the surroundings of the vehicle.

In these related art systems, the locations of the cameras are fixed with respect to each other, because they are mounted at fixed positions on a single-body vehicle. Existing algorithms for the related art systems cannot combine the images if the cameras change their relative positions, such as if one camera is mounted on the tractor and another camera is mounted on the trailer, and the tractor and trailer are traveling in different directions. However, in order to provide complete coverage of the surroundings of the articulated vehicle, it would be advantageous to arrange cameras on both the tractor and the trailer.

SUMMARY OF THE INVENTION

Exemplary embodiments of the invention provide systems and methods for generating an image of the surroundings of an articulated vehicle. According to a method of the invention, a processor determines a relative position between a first vehicle of an articulated vehicle and a second vehicle of the articulated vehicle; receives a first image from a first camera arranged on the first vehicle and a second image from a second camera arranged on the second vehicle; and combines the first image and the second image based on the relative position between the first vehicle and the second vehicle to generate a combined image of surroundings of the articulated vehicle.

The relative position between the first vehicle and the second vehicle may be determined based on an angle between the first vehicle and the second vehicle, and the angle may be measured by an angular sensor arranged on the articulated vehicle.

Alternatively, the relative position between the first vehicle and the second vehicle may be determined based on a first motion of the first vehicle and a second motion of the second vehicle, the first motion may be measured by at least one first sensor arranged on the first vehicle, and the second motion may be measured by at least one second sensor arranged on the second vehicle. The first motion and the second motion may be used to determine an angle between the first vehicle and the second vehicle. Each of the first motion and the second motion may include a vehicle speed, a wheel speed, a yaw rate, and/or an acceleration.

As another alternative, the relative position between the first vehicle and the second vehicle may be determined by detecting at least one feature of the second vehicle that appears in at least two images from the first camera, or the relative position between the first vehicle and the second vehicle may be determined by detecting at least one feature of the first vehicle that appears in at least two images from the second camera. A first one of the images from the first camera may be acquired when an angle between the first vehicle and the second vehicle is zero, and a second one of the images from the first camera may be acquired when the angle between the first vehicle and the second vehicle is non-zero.

The relative position between the first vehicle and the second vehicle may be determined continuously. The first image and the second image may be combined by rotating the first image and the second image with respect to each other, based on an angle between the first vehicle and the second vehicle. The first image and the second image may be transformed into ground plane images before rotating the first image and the second image.

The processor may also superimpose information from an active sensing system on the combined image, and components of the active sensing system may be arranged on the first vehicle and/or the second vehicle. The components may include ultrasonic sensors and/or radar sensors. The information may be color-coded to indicate a type and a relevance of objects detected by the active sensing system. The processor may display the combined image and a forward-view image, wherein the forward-view image is acquired by a forward-facing camera arranged on the first vehicle. The combined image may be a birds-eye view image of the surroundings of the articulated vehicle.

According to another aspect of the invention, a system for generating an image of the surroundings of an articulated vehicle is provided. The system includes a first camera arranged on a first vehicle of an articulated vehicle; a second camera arranged on a second vehicle of the articulated vehicle; a memory; and a processor coupled to the memory. The processor includes position determining logic that determines a relative position between the first vehicle and the second vehicle; image receiving logic that receives a first image from the first camera and a second image from the second camera; and image combination logic that combines the first image and the second image based on the relative position between the first vehicle and the second vehicle to generate a combined image of surroundings of the articulated vehicle.

According to yet another aspect of the invention, a non-transitory computer-readable medium including computer instructions executable by a processor to cause the processor to perform the methods discussed above is provided.

Other objects, advantages, and novel features of the present invention will become apparent from the following detailed description of the invention when considered in conjunction with the accompanying drawings.

DETAILED DESCRIPTION OF EXEMPLARY EMBODIMENTS

Figure 1:
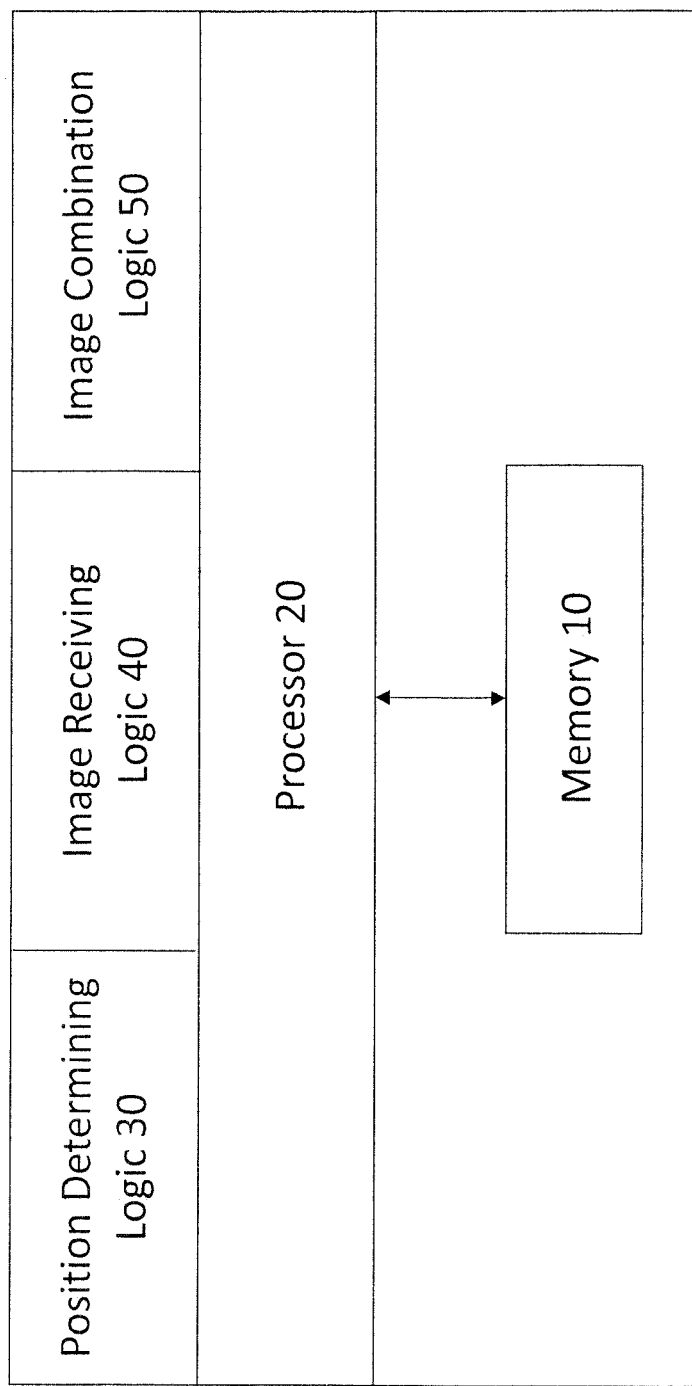
FIG. 1 shows a block diagram of an exemplary embodiment of a system for generating an image of the surroundings of an articulated vehicle.

FIG. 1 shows a block diagram of an exemplary embodiment of a system for generating an image of the surroundings of an articulated vehicle, which includes at least two vehicles that may move with respect to each other. As shown in FIG. 1, the system includes a memory 10 and a processor 20 coupled to the memory 10. The processor 20 includes logic 30-50, which will be described in more detail below in connection with FIG. 2. The processor 20 can be any type of processor, such as a microprocessor, a field programmable gate array (FPGA), and/or an application specific integrated circuit (ASIC). When the processor 20 is a microprocessor, logic 30-50 can be processor-executable code that is loaded from the memory 10.

Figure 2:
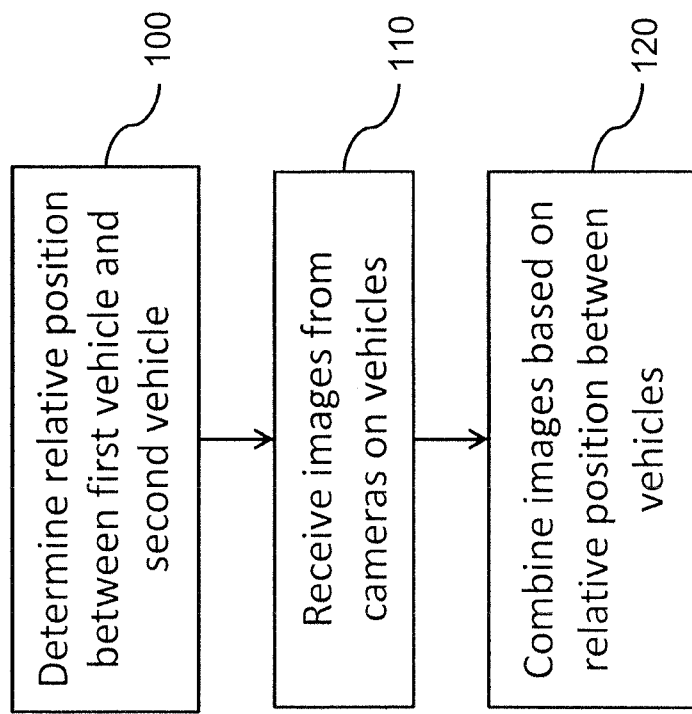
FIG. 2 shows a flowchart of an exemplary embodiment of a method for generating an image of the surroundings of an articulated vehicle.
Figure 3:
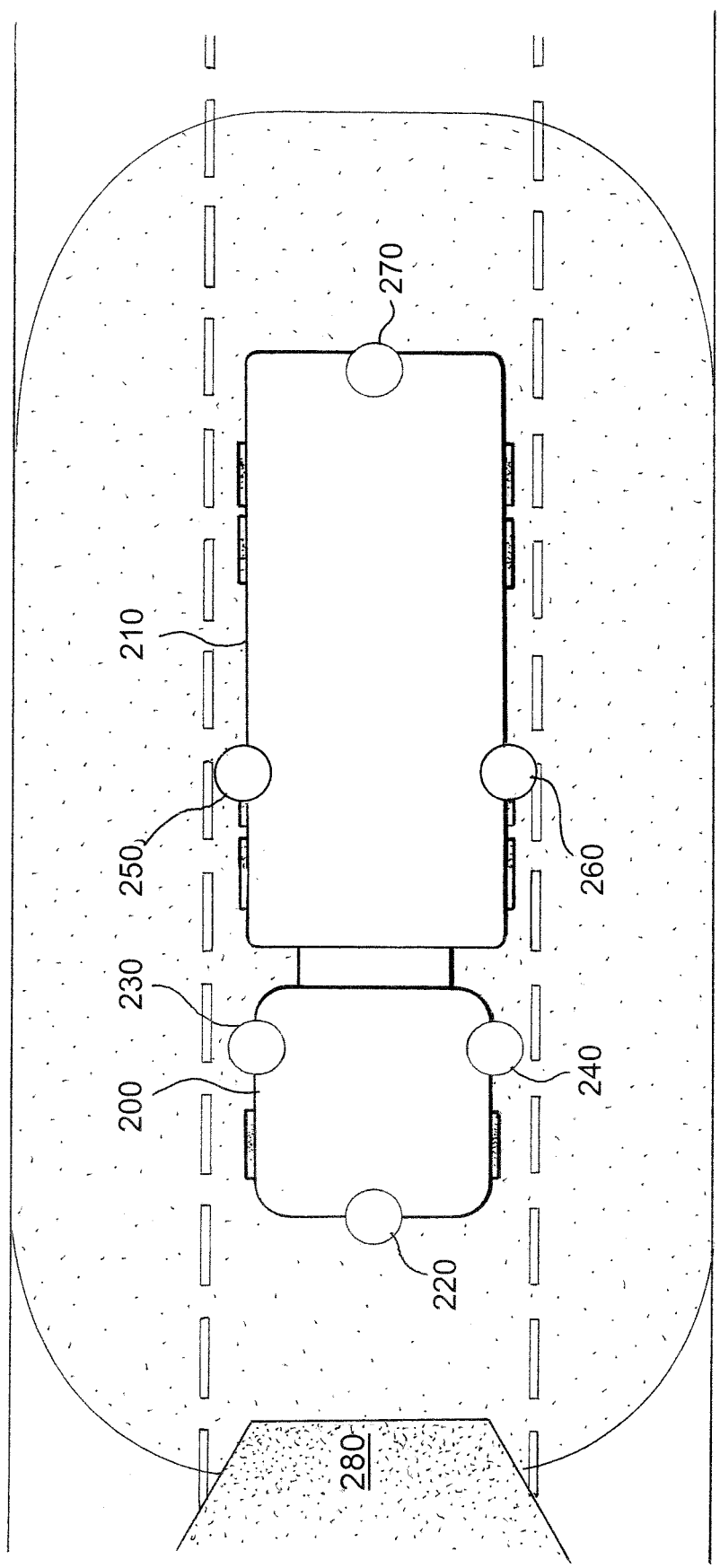
FIG. 3 shows an example of an articulated vehicle having cameras arranged on the tractor and the trailer.

FIG. 2 shows a flowchart of an exemplary embodiment of a method for generating an image of the surroundings of the articulated vehicle. For example, as shown in FIG. 3, the articulated vehicle may include a first vehicle 200 that is a tractor and a second vehicle 210 that is a trailer. A plurality of cameras 220, 230, and 240 may be arranged on the first vehicle 200, and a plurality of cameras 250, 260, and 270 may be arranged on the second vehicle 210. For example, the cameras may face downward to obtain a birds-eye view image. Alternatively, the cameras may be ultra-wide angle cameras with fisheye lenses, such as a Sunex® lens with an Omnivision® high dynamic range sensing chip. Any appropriate number and arrangement of cameras may be used, and the configuration shown in FIG. 3 is only one non-limiting example. Advantageously the cameras may be arranged to provide complete 360° coverage of the surroundings of the articulated vehicle. In addition, more than one trailer may be attached to form a road train.

Figure 4A:
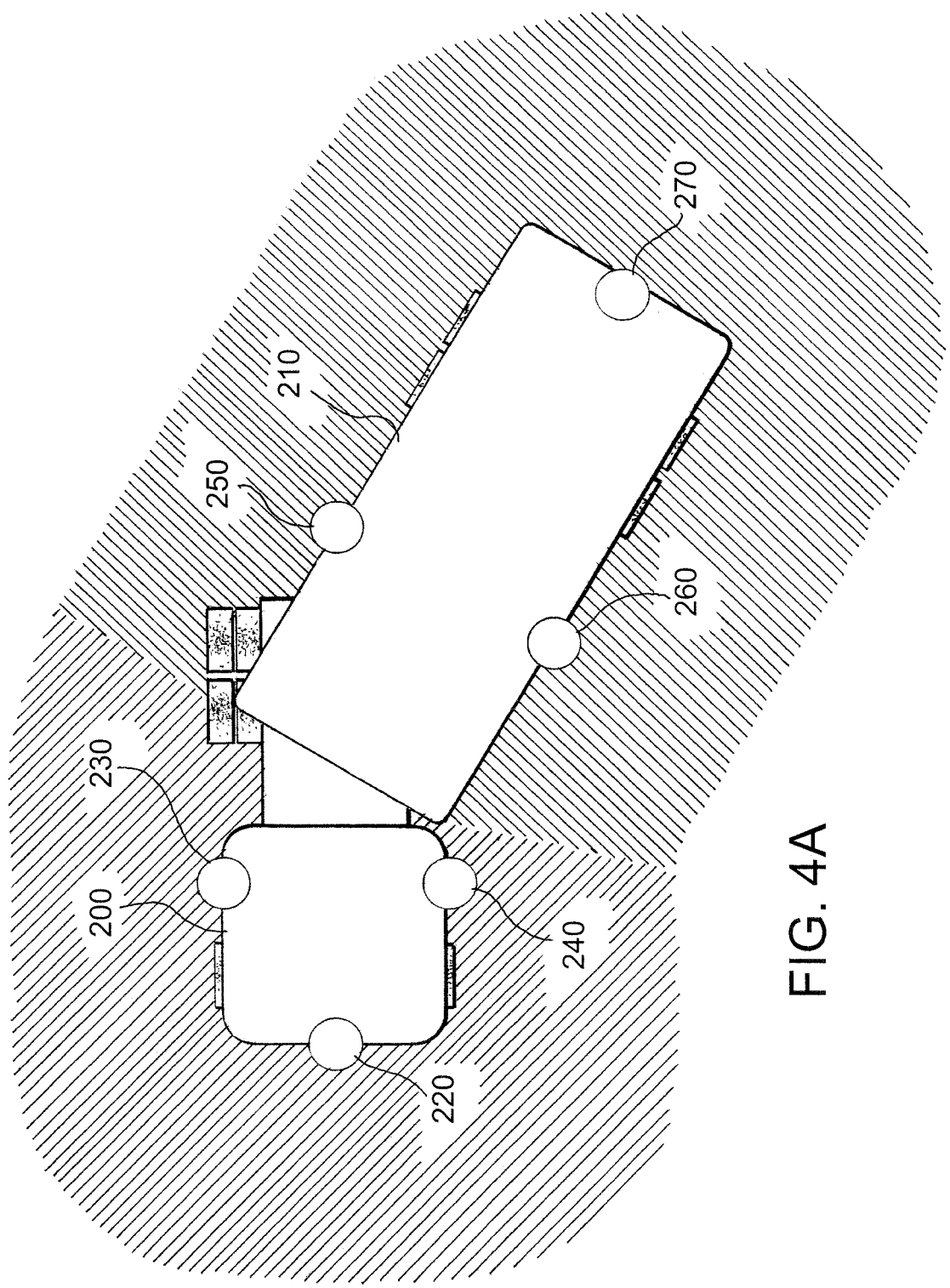
FIGS. 4A and 4B show an angle between the tractor and the trailer as the tractor begins to make a turn.

As discussed above, because the first vehicle 200 and the second vehicle 210 are capable of moving with respect to each other, the positions of the cameras 220, 230, and 240 arranged on the first vehicle 200 are not fixed with respect to the positions of the cameras 250, 260, and 270 arranged on the second vehicle 210. On the contrary, as shown in FIG. 4A, as the first vehicle 200 starts to turn, an angle is formed between the first vehicle 200 and the second vehicle 210, and the relative positions of the cameras 220, 230, and 240 arranged on the first vehicle 200 change with respect to the positions of the cameras 250, 260, and 270 arranged on the second vehicle 210.

Figure 4B:
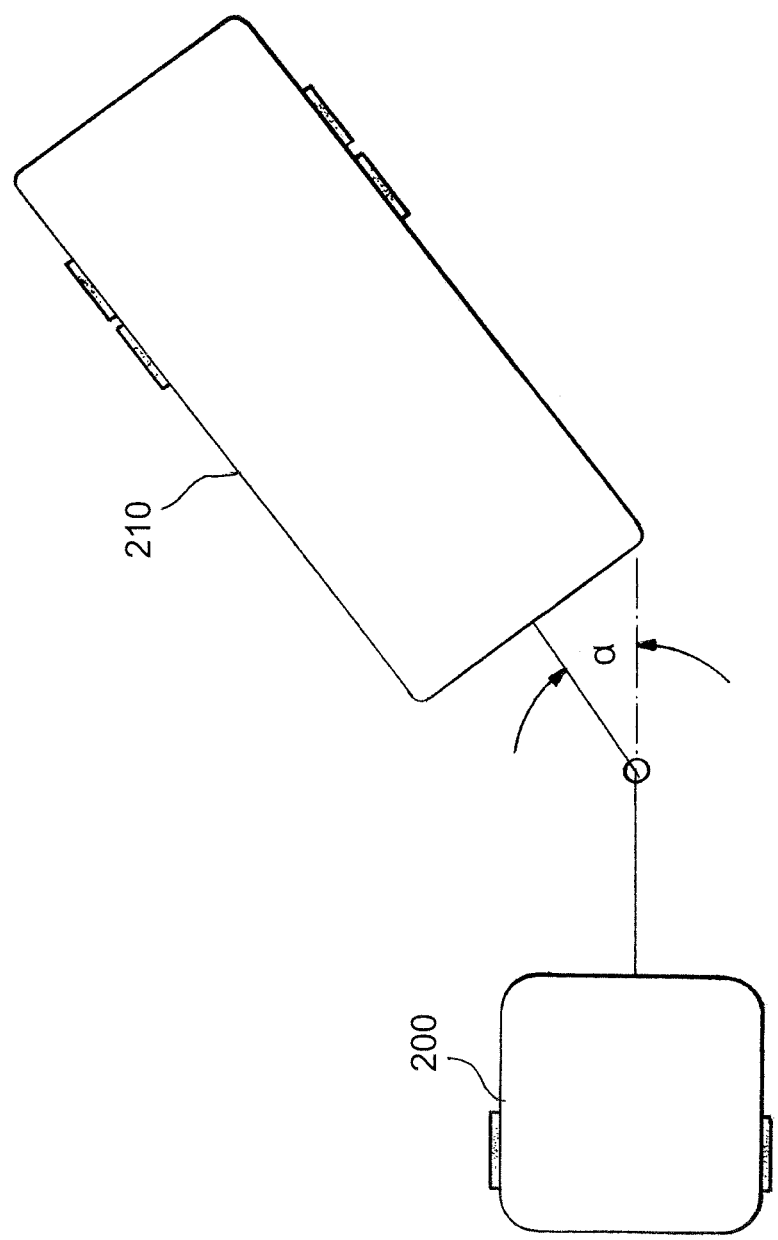

Accordingly, as shown in FIG. 2, the position determining logic 30 determines the relative position between the first vehicle 200 and the second vehicle 210 of the articulated vehicle at step 100. The relative position may be determined by any appropriate method, and may be determined continuously or at predetermined intervals. As shown in FIG. 4B, the angle $\alpha$ between the first vehicle 200 and the second vehicle 210 may be determined. For example, an angular sensor arranged on the articulated vehicle may be used to directly measure the angle $\alpha$ between the first vehicle 200 and the second vehicle 210. Alternatively, various sensors arranged on the first vehicle 200 and/or the second vehicle 210 may be used to measure the motion of the first vehicle 200 and/or the second vehicle 210, such as individual wheel speed sensors, yaw rate sensors, and/or accelerometers. Further, the vehicle speed may be determined from the wheel speed sensors, from the engine, or from any other appropriate source. Measurements from these sensors may be input to a model of the articulated vehicle, such as a bicycle model, in order to determine the angle $\alpha$ between the first vehicle 200 and the second vehicle 210.

As yet another alternative, the angle $\alpha$ between the first vehicle 200 and the second vehicle 210 may be determined by using the cameras 220, 230, 240, 250, 260, and/or 270 to detect common features in images recorded by the cameras. For example, as shown in FIG. 4A, the camera 240 may protrude from the first vehicle 200 and have a downward-looking fisheye lens. Accordingly, the field of view of the camera 240 includes everything below the height of the camera 240 and extends out to the horizon, including parts of the second vehicle 210, such as the left-front trailer edge, the wheels, and/or markings on the side. These features can be used to determine the angle $\alpha$ between the first vehicle 200 and the second vehicle 210, as discussed in further detail below.

For example, the camera 240 may collect images while the angle $\alpha$ is zero, such as when the articulated vehicle is traveling straight down a highway. These images indicate where the features appear on average. For example, the average of the center of the wheels may be determined, and/or the average image column in which the left-front trailer edge appears may be determined. As an alternative, a geometrical model may be used to determine where the features appear while the angle $\alpha$ is zero. When the first vehicle 200 turns, the angle $\alpha$ can be determined based on a comparison of the features in the current image with the features while the angle $\alpha$ is zero. For example, the angle $\alpha$ may be determined by comparing the position and/or the shape of the wheels. This analysis may also account for characteristics of the camera 240, such as the focal length of the lens, and the known geometry of the articulated vehicle.

Figure 5:
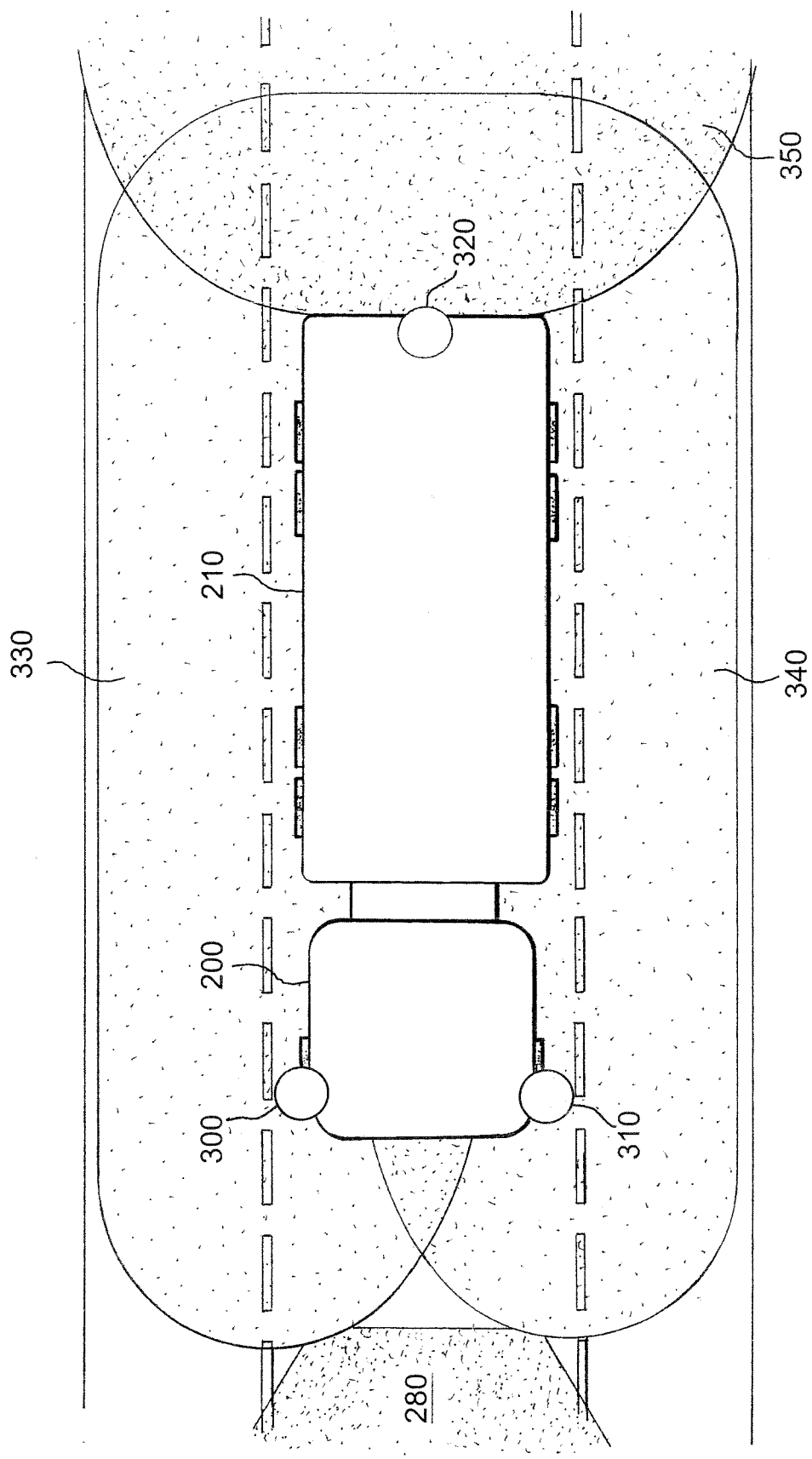
FIG. 5 shows another example of an articulated vehicle having cameras arranged on the tractor and the trailer.

Returning to FIG. 2, the image receiving logic 40 receives images acquired by the cameras arranged on the first vehicle 200 and the second vehicle 210, respectively at step 110. The cameras may be configured to acquire images simultaneously and at the same frame rate. The fields of view of the cameras may have some overlap. FIG. 5 shows a simplified example in which camera 300 has a field of view 330, camera 310 has a field of view 340, and camera 320 has a field of view 350. In this example, the fields of view 330 and 340 overlap near a central axis of the articulated vehicle, and the field of view 350 overlaps with the field of view 330 and/or the field of view 340 behind the second vehicle 210.

The image combination logic 50 combines the received images based on the relative position between the first vehicle 200 and the second vehicle 210 at step 120. Referring to FIG. 4A, the images may be combined by stitching together images acquired by the cameras 220, 230, and 240 arranged on the first vehicle 200 to generate a first image; stitching together images acquired by the cameras 250, 260, and 270 arranged on the second vehicle 210 to generate a second image; and stitching together the first image and the second image after aligning the first image and the second image based on the angle α between the first vehicle 200 and the second vehicle 210.

Figure 6:
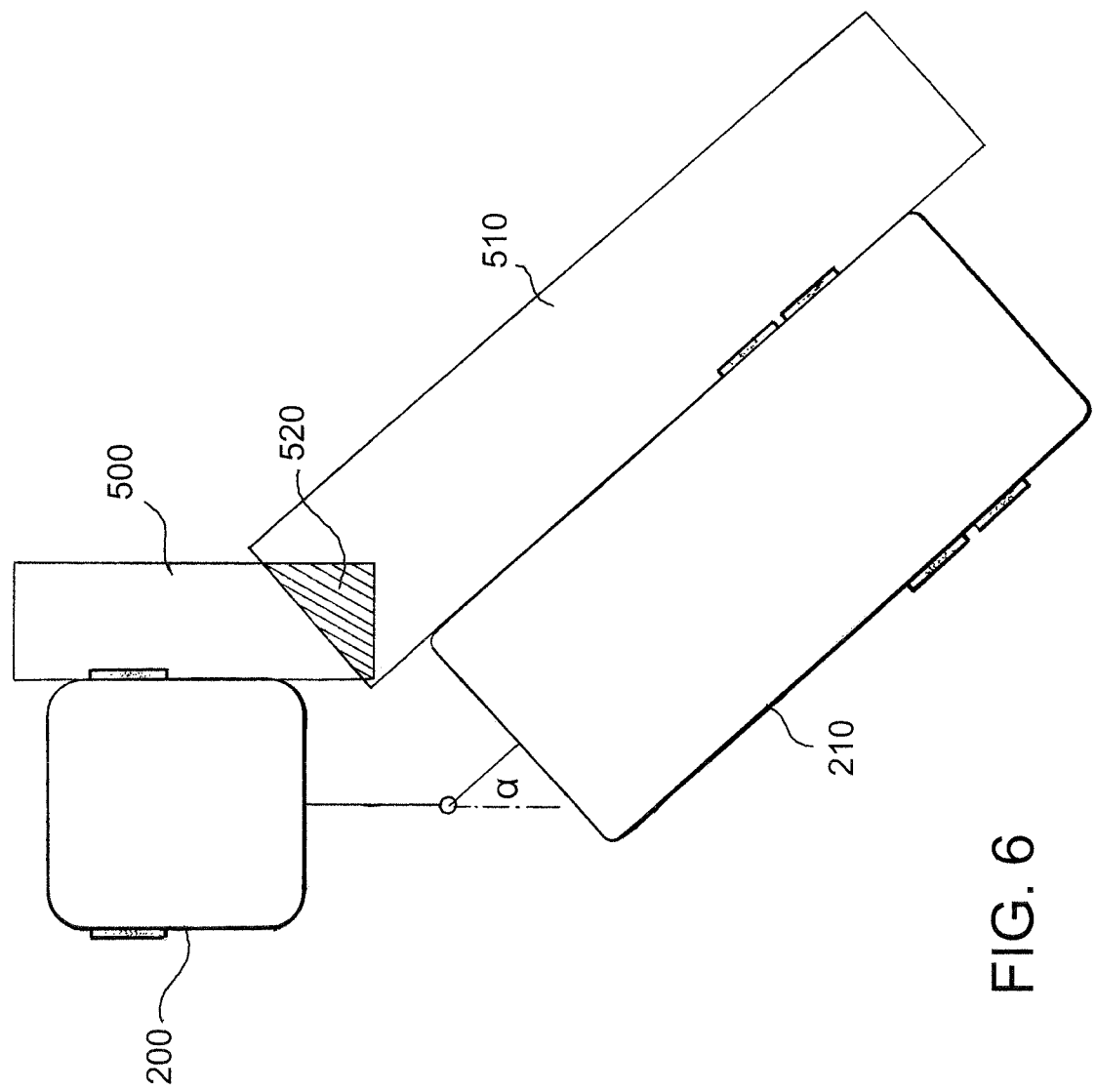
FIG. 6 shows an example of combining two images based on the angle between the tractor and the trailer.

FIG. 6 shows a first example in which the first image 500 and the second image 510 are combined by defining a junction between the first image 500 and the second image 510 based on the angle α between the first vehicle 200 and the second vehicle 210. In this example, portions of the first image 500 and/or the second image 510 are removed in the region 520 where the first image 500 and the second image 510 overlap to form a combined image. The removed portions are determined by the geometry of the system, including the angle α.

Figure 7:
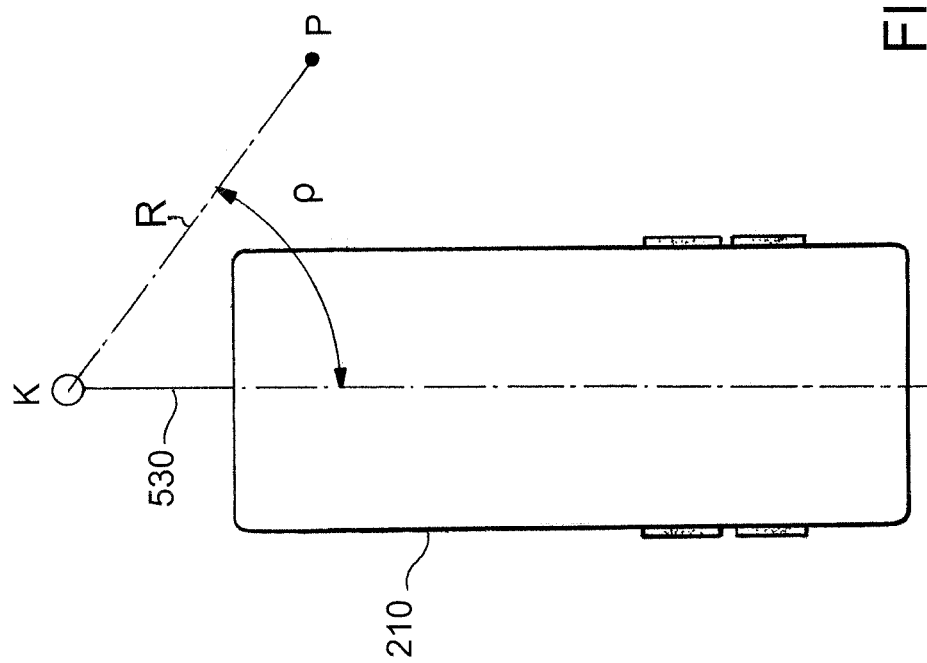
FIG. 7 shows an example of a ground plane into which the images may be transformed.

As a second example, the first image and the second image may be combined by translating and rotating the images with respect to each other based on the angle α between the first vehicle 200 and the second vehicle 210. The first image and the second image are converted into ground plane images by applying the homography matrix H of the respective camera to the image according to H*(px py 1), where px and py are the locations of the pixels in the image plane. The homography matrix H may be defined during a calibration phase according to known methods. FIG. 7 shows an example of a ground plane, in which the ground plane projection of each pixel P within an image is positioned at a distance R from the kingpin K and forms an angle α with respect to the longitudinal axis 530 of the second vehicle 210. A rotation is then applied to the ground plane coordinates, such that the rotated lateral location is given by R*sin(ρ+α) and the rotated longitudinal location of the pixel P is given by R*cos(ρ+α). Once this process has been completed for both images, the images are combined as described above with reference to FIG. 6. It is possible to use only a portion of the first image 500, only a portion of the second image 510, or portions of both the first image 500 and the second image 510 for the overlap region 520.

Because the angle α changes as the first vehicle 200 turns, the images may be acquired continuously or periodically, and may be combined based on the changing angle α. Accordingly, the combined image of the surroundings of the articulated vehicle may be updated continuously or periodically. The examples discussed above result in a birds-eye view image of the surroundings of the articulated vehicle. However, the examples may be modified to produce a surround view of the surroundings of the articulated vehicle.

Figure 8:
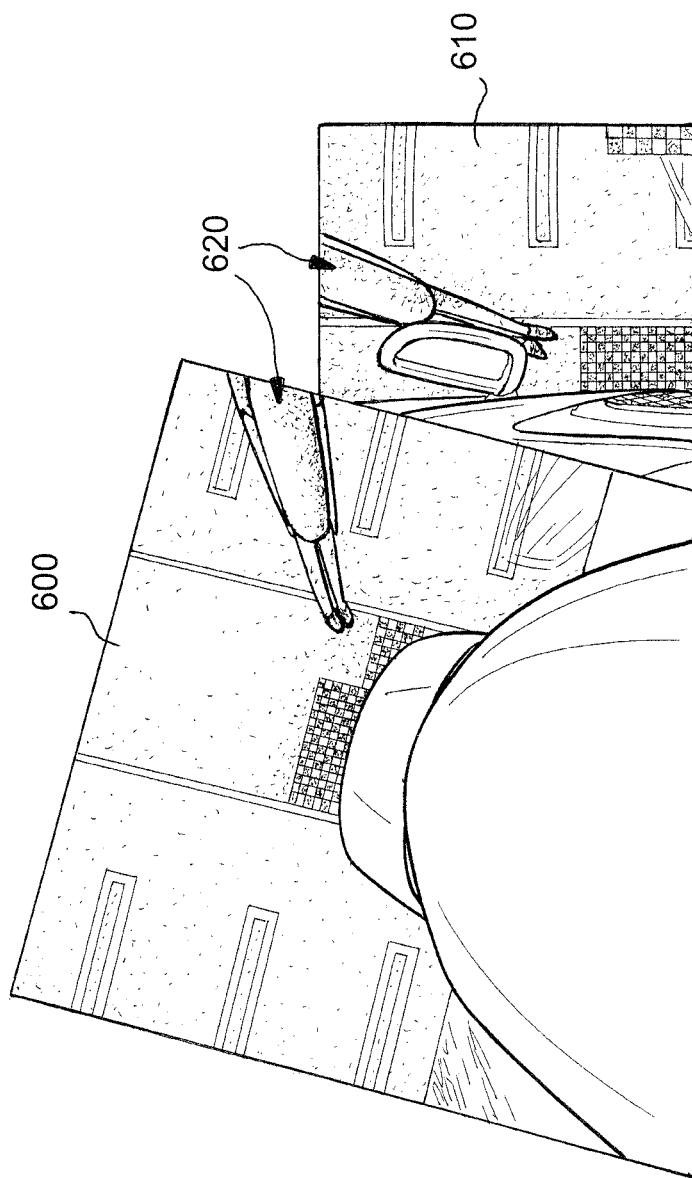
FIG. 8 shows an example of detecting a three-dimensional object within the images.

The methods described above may also be used to alert the driver of the articulated vehicle that there is an object in the surroundings of the articulated vehicle. FIG. 8 shows a first image 600 and a second image 610 that have been converted into ground plane images. As shown in FIG. 8, the first image 600 and the second image 610 can be translated and rotated with respect to each other in order to align the lane markings on the parking lot, because the lane markings are within the ground plane. However, it is not possible to align the person 620 standing in the first image 600 and the second image 610, because the person 620 projects above the ground plane in three dimensions. This information can be used to warn the driver to avoid the person 620 when maneuvering the articulated vehicle.

Figure 9:
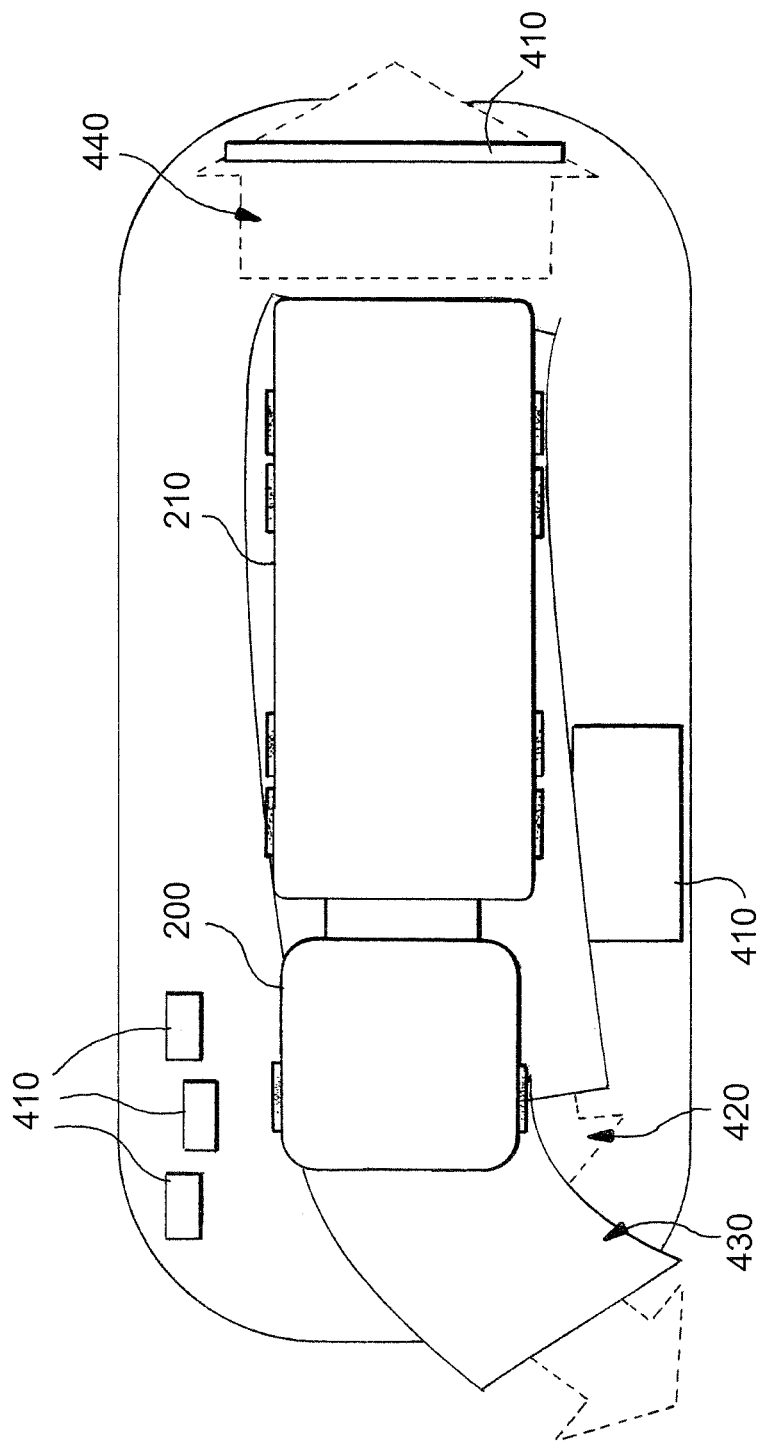
FIG. 9 shows an embodiment in which an active sensing system is used to superimpose information about objects in the surroundings of the articulated vehicle on the birds-eye view image.

FIG. 9 shows another embodiment in which an active sensing system is used to superimpose information about objects in the surroundings of the articulated vehicle on the birds-eye view image. For example, active sensing components, such as ultrasonic sensors and/or radar sensors, may be arranged on the first vehicle 200 and/or the second vehicle 210. These active sensing components may detect objects 410, such as pedestrians, other vehicles, and/or obstacles. Representations of these objects 410 may then be superimposed on the birds-eye view image of the surroundings of the articulated vehicle. The representations of the objects 410 may be color-coded in order to indicate the type and relevance of the objects 410. For example, the relevance may indicate whether the articulated vehicle is likely to collide with the object 410.

The birds-eye view image may include the current state of the articulated vehicle, including the current angle α between first vehicle 200 and the second vehicle 210. Further, the birds-eye view image may be displayed with a forward-view image of an area 280 in front of the first vehicle 200, as shown in FIGS. 3 and 5. In addition, path predictions 420 and 430 for the second vehicle 210 and the first vehicle 200, respectively, may be included, as shown in FIG. 9. Maneuvering guidance 440 may also be included, as shown in FIG. 9.

Although the embodiments described above obtain images from cameras arranged on the first vehicle 200 and the second vehicle 210 of an articulated vehicle, a similar method could be applied to cameras arranged on different parts of a single vehicle that move with respect to each other. For example, a tractor may include a cabin mounted on springs, such that the cabin can move with respect to a rigid base of the tractor. The relative position between the cabin and the rigid base may be determined, and images from a camera mounted on the cabin may be combined with images mounted on the rigid base to provide a combined image of the surroundings of the tractor, according to the general principles discussed above.

The methods discussed above are executed by a computer processor that is programmed to perform the methods so that the processor executes the programming to perform the methods. Such a processor is needed to handle the large volumes of data and to perform the complex and computationally-intensive analysis of the methods discussed above. In addition, the processor is required to perform the methods in a commercially viable timeframe. Accordingly, it is necessary to quickly process large and complex data sets.

According to another exemplary embodiment of the invention, there is provided a non-transitory computer-readable medium encoded with a computer program for generating an image of the surroundings of an articulated vehicle. The term "computer-readable medium" as used herein refers to any medium that participates in providing instructions for execution. Common forms of computer-readable media include, for example, a floppy disk, a flexible disk, a hard disk, magnetic tape, any other magnetic medium, a CD-ROM, any other optical medium, punch cards, paper tape, any other physical medium with patterns of holes, a RAM, a PROM, an EPROM, a FLASH-EPROM, any other memory chip or cartridge, and any other non-transitory medium from which a computer can read.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method comprising:
   determining, by a processor, an angle between a first vehicle of an articulated vehicle and a second vehicle of the articulated vehicle as the first and second vehicles rotate laterally relative to each other around a point at which the first and second vehicles are connected to each other, based on a relative position between a first camera arranged on the first vehicle and a second camera arranged on the second vehicle, the first and second cameras being located on a same side of the articulated vehicle;
   receiving, by the processor, a first image from the first camera arranged on the first vehicle and a second image from the second camera arranged on the second vehicle, the first and second images being obtained from the same side of the articulated vehicle; and
   combining, by the processor, the first image and the second image based on the relative position between the first camera and the second camera to generate a combined image of surroundings of the articulated vehicle on the same side thereof, wherein the first image and the second image are combined by rotating the first image and the second image with respect to each other, based on the angle between the first vehicle and the second vehicle.

2. The method according to claim 1, wherein the angle is measured by an angular sensor arranged on the articulated vehicle.

3. The method according to claim 1, wherein the angle between the first vehicle and the second vehicle is determined based on a first motion of the first vehicle and a second motion of the second vehicle, the first motion is measured by at least one first sensor arranged on the first vehicle, and the second motion is measured by at least one second sensor arranged on the second vehicle.

4. The method according to claim 3, wherein each of the first motion and the second motion comprises at least one of a vehicle speed, a wheel speed, a yaw rate, and an acceleration.

5. The method according to claim 1, wherein the angle between the first vehicle and the second vehicle is determined by detecting at least one feature of the second vehicle that appears in at least two images from the first camera.

6. The method according to claim 5, wherein a first one of the images from the first camera is acquired when the angle between the first vehicle and the second vehicle is zero, and a second one of the images from the first camera is acquired when the angle between the first vehicle and the second vehicle is non-zero due to the first and second vehicles rotating laterally relative to each other around the point at which the first and second vehicles are connected to each other.

7. The method according to claim 1, wherein the angle between the first vehicle and the second vehicle is determined by detecting at least one feature of the first vehicle that appears in at least two images from the second camera.

8. The method according to claim 7, wherein a first one of the images from the first camera is acquired when the angle between the first vehicle and the second vehicle is zero, and a second one of the images from the first camera is acquired when the angle between the first vehicle and the second vehicle is non-zero due to the first and second vehicles rotating laterally relative to each other around the point at which the first and second vehicles are connected to each other.

9. The method according to claim 1, wherein the relative position between the first vehicle and the second vehicle is determined continuously.

10. The method according to claim 1, wherein the first image and the second image are transformed into ground plane images before rotating the first image and the second image.

11. The method according to claim 1, further comprising superimposing information from an active sensing system on the combined image, wherein components of the active sensing system are arranged on at least one of the first vehicle and the second vehicle.

12. The method according to claim 11, wherein the components comprise at least one of ultrasonic sensors and radar sensors.

13. The method according to claim 11, wherein the information is color-coded to indicate a type and a relevance of objects detected by the active sensing system.

14. The method according to claim 1, further comprising displaying the combined image and a forward-view image, wherein the forward-view image is acquired by a forward-facing camera arranged on the first vehicle.

15. The method according to claim 1, wherein the combined image is a birds-eye view image of the surroundings of the articulated vehicle.

16. The method according to claim 1, further comprising:
    detecting, by an active sensing system arranged on at least one of the first vehicle and the second vehicle, objects in the surroundings of the articulated vehicle; and
    superimposing information and representations of the detected objects on the combined image, wherein the combined image is a birds-eye view image of the surroundings of the articulated vehicle.

17. The method according to claim 16, wherein the superimposed information indicates a type of the detected objects.

18. The method according to claim 17, wherein the superimposed information further indicates a likelihood of the articulated vehicle colliding with the detected objects.

19. A system comprising:
    a first camera arranged on a first vehicle of an articulated vehicle;
    a second camera arranged on a second vehicle of the articulated vehicle, wherein the first and second cameras are arranged on a same side of the articulated vehicle;
    a memory; and
    a processor coupled to the memory, the processor comprising:
        position determining logic that determines an angle between the first vehicle and the second vehicle as the first and second vehicles rotate laterally relative to each other around a point at which the first and second vehicles are connected to each other, based on a relative position between a first camera arranged on the first vehicle and a second camera arranged on the second vehicle, the first and second cameras being located on a same side of the articulated vehicle;
        image receiving logic that receives a first image from the first camera and a second image from the second camera, the first and second images being obtained from the same side of the articulated vehicle; and
        image combination logic that combines the first image and the second image based on the relative position between the first camera and the second camera to generate a combined image of surroundings of the articulated vehicle on the same side thereof, wherein the first image and the second image are combined by rotating the first image and the second image with respect to each other, based on the angle between the first vehicle and the second vehicle.

20. A non-transitory computer-readable medium storing computer instructions executable by a processor to cause the processor to perform a method comprising:

determining an angle between a first vehicle of an articulated vehicle and a second vehicle of the articulated vehicle as the first and second vehicles rotate laterally relative to each other around a point at which the first and second vehicles are connected to each other, based on a relative position between a first camera arranged on the first vehicle and a second camera arranged on the second vehicle, the first and second cameras being located on a same side of the articulated vehicle;

receiving images from a first camera arranged on the first vehicle and a second camera arranged on the second vehicle, the first and second images being obtained from the same side of the articulated vehicle; and combining the first image and the second image based on the relative position between the first camera and the second camera to generate a combined image of surroundings of the articulated vehicle on the same side thereof, wherein the first image and the second image are combined by rotating the first image and the second image with respect to each other, based on the angle between the first vehicle and the second vehicle.

* * * * *